United States Patent

Watanabe et al.

[11] Patent Number: 5,933,407
[45] Date of Patent: *Aug. 3, 1999

[54] STRUCTURE FOR SUPPORTING OPTICAL PICKUP

[75] Inventors: Masayoshi Watanabe; Hiroshi Ogasawara, both of Yokohama; Shozo Saegusa, Ibaraki-ken; Toshio Sugiyama, Yokohama, all of Japan

[73] Assignee: Hitachi, Ltd., Tokyo, Japan

[ * ] Notice: This patent is subject to a terminal disclaimer.

[21] Appl. No.: 08/773,226

[22] Filed: Dec. 23, 1996

Related U.S. Application Data

[63] Continuation of application No. 08/532,873, Sep. 22, 1995, Pat. No. 5,615,204.

[30] Foreign Application Priority Data

Sep. 30, 1994 [JP] Japan ................................ 6-236438

[51] Int. Cl.⁶ .............................. G11B 7/08; G11B 21/02
[52] U.S. Cl. ......................... 369/247; 369/219; 359/823
[58] Field of Search ................................ 369/219, 220, 369/223, 44.14, 44.15, 44.16, 44.21, 44.22, 251, 253, 244, 246, 247, 248, 249; 359/814, 823, 824

[56] References Cited

U.S. PATENT DOCUMENTS

| 4,974,222 | 11/1990 | Ishitoya et al. | 369/219 |
|---|---|---|---|
| 5,046,062 | 9/1991 | Yamashita | 369/219 |
| 5,063,548 | 11/1991 | Yamashita et al. | 369/44.14 |
| 5,150,343 | 9/1992 | Goto et al. | 369/44.14 |
| 5,172,367 | 12/1992 | Hinotami | 369/244 |
| 5,615,204 | 3/1997 | Watanabe et al. | 369/247 |

FOREIGN PATENT DOCUMENTS

| 39 14 303 A1 | 10/1990 | Denmark . | |
|---|---|---|---|
| 38 39 708 C2 | 4/1994 | Denmark . | |
| 58-183668 | 8/1983 | Japan | 369/219 |
| 62-162251 | 7/1987 | Japan | 369/44.14 |
| 63-113874 | 5/1988 | Japan | 369/244 |
| 63-121183 | 5/1988 | Japan | 369/244 |
| 1-86377 | 3/1989 | Japan | 369/247 |
| 1-88925 | 4/1989 | Japan | 369/244 |
| 4-351782 | 12/1992 | Japan . | |
| 5-27862 | 4/1993 | Japan . | |
| 5-144245 | 6/1993 | Japan . | |
| 6-38063 | 5/1994 | Japan . | |

*Primary Examiner*—David L. Ometz
*Attorney, Agent, or Firm*—Antonelli, Terry, Stout & Kraus, LLP

[57] ABSTRACT

An optical disk apparatus comprises an optical pickup for directing a light beam onto pits formed in an optical disk and for receiving reflected light from the optical disk, an optical pickup supporting member including two guide rods for guiding the optical pickup in a radial direction of the optical disk, two first mounting members for mounting ends of one guide rod, and two second mounting members for mounting ends of the other guide rod, a chassis for mounting the first and second mounting members, an optical pickup driving mechanism including gears and a motor to move the optical pickup in a radial direction of the optical disk, a turntable on which the optical disk is located, and an optical disk drive motor for rotating the turntable. Each of the first fixing members includes a base fixed to the chassis, a guide rod supporting member for fixedly supporting the guide rod, and a flexible member located between the base and the guide rod supporting member for causing the guide rod supporting member to be displaced in a vertical direction with respect to a surface of the optical disk. A natural frequency of a system consisting of the one guide rod, the first mounting member, and the chassis is set to be less than that of the optical pickup, and of the optical disk.

18 Claims, 5 Drawing Sheets

STRUCTURE FOR SUPPORTING OPTICAL PICKUP

This application is a Continuation of application Ser. No. 08/532,873, filed Sep. 22, 1995, now U.S. Pat. No. 5,615,204.

TECHNICAL BACKGROUND

This invention is related to a structure for supporting an optical pickup which reads out information recorded on an optical disk such as a compact disk, a video disk, or the like, and more specifically, to a structure for supporting an optical pickup that prevents resonance from occurring between an optical disk and the optical pickup, thereby preventing misreading of signals.

BACKGROUND OF THE INVENTION

Japanese Patent Application Laid-Open No. 5-27862 teaches a technique for supporting an optical pickup in which guide rods formed of elastic material are fixed to a chassis so as to properly guide the optical pickup. On the other hand, Japanese Patent Application Laid-Open No. 6-38063 teaches a technique in which a first member for fixedly mounting one end of a guide rod is fixed on a chassis, and a second member for fixedly mounting the other end of the guide rod is fixed on the chassis, thereby fixedly supporting the guide rod.

In both techniques, the guide rod is fixedly mounted on the chassis so as not to wobble. This causes vibrations to be transferred from the optical pickup to the guide rod, and from the guide rod via the chassis to the optical disk. On the other hand, when the optical disk is rotated, the optical disk vibrates at its natural or characteristic frequency. As a result, the vibrations of the optical disk are transferred via the guide rod to the optical pickup. Accordingly, since the vibrations are transferred back and forth, resonance occurs between the optical disk and the optical pickup, which causes signals recorded on the optical disk to be misread by the optical pickup.

The object of the present invention is to provide a structure for supporting an optical pickup of an optical disk apparatus which prevents the resonance from occurring between the optical disk and the optical pickup, whereby the optical pickup can properly read out signals from the optical disk.

Another object of the present invention is to provide a structure for supporting an optical pickup of an optical disk apparatus which prevents the resonance from occurring between the optical disk and the optical pickup, and which is simple and can be applied to a thin optical disk apparatus.

SUMMARY OF THE INVENTION

The above and other objects of the present invention are accomplished by an optical pickup apparatus comprising an optical pickup for directing a light beam onto pits formed in an optical disk and for receiving reflected light from the optical disk, an optical pickup supporting member including two guide rods for guiding the optical pickup to move it in a radial direction of the optical disk, two first mounting members for mounting ends of one guide rod, and two second mounting members for mounting ends of the other guide rod, and a chassis for mounting the first and second mounting members, each of said first mounting members including a base fixed to said chassis, a guide rod supporting member for fixedly supporting said guide rod, and a flexible member located between said base and said guide rod supporting member for causing said guide rod supporting member to be displaced in a vertical direction with respect to a surface of the optical disk without causing the guide rod supporting member to be displaced in a horizontal direction with respect to the surface of the optical disk, wherein a natural frequency of a system consisting of said optical pickup, said optical pickup supporting member, and said chassis is set to be less than that of said optical pickup and that of the optical disk.

According to the present invention, since vibrations of the optical disk and the optical pickup are intercepted by the first mounting members so as not to be transferred to each other, it is possible to prevent resonance from occurring between the optical disk and the optical pickup, and therefore, to improve the accuracy of the position of the optical pickup.

In a preferred aspect of the present invention, said natural frequency of said system is less than $1/\sqrt{2}$ times that of said optical pickup.

According to this aspect of the invention, the transmissibility of vibrations can be made less than 1. As a result, it is possible to efficiently prevent the vibrations of the optical pickup from being transferred via the chassis to the optical disk.

In another preferred aspect of the present invention, said first mounting members are integrally formed, and said flexible sections are formed as thin sections located between said bases and said guide rod supporting members.

According to this aspect of the invention, mounting members which are simple and easy to manufacture can efficiently intercept the vibrations from the optical pickup.

In a further preferred aspect of the present invention, said chassis includes holes each for receiving the guide rod supporting member, said guide rod supporting member passing therethrough so as to be displaced downwardly.

According to this aspect of the invention, since the height in the vertical direction of the guide rod supporting member is made small, the optical pickup apparatus can be installed in a thin optical disk apparatus.

In a still further preferred aspect of the present invention, each of said guide rod supporting members includes a protruding section passing through said hole and extending downwardly and an extended section parallel to a lower surface of said chassis and extending from an end of said protruding section, said guide rod supporting member being displaced upwardly by a predetermined distance, and said extended section coming into contact with said lower surface of said chassis to restrict further displacement of said guide rod supporting member.

In a further preferred aspect of the present invention, one of said first mounting members located at an inner side of the optical disk includes a movement restricting section extending outwardly from said base for restricting further movement of the optical pickup in the radial direction toward a center of the optical disk.

In a still further preferred aspect of the present invention, each of said guide rod supporting members includes an aperture for receiving said guide rod.

In a further preferred aspect of the present invention, a cross section of said aperture is substantially square, said guide rod being supported by four predetermined areas of an inner surface of said guide rod supporting member.

According to this aspect of the invention, the guide rod can be accurately supported by substantial point contact.

In a further preferred aspect of the present invention, said natural frequency of said system is selected in a range of 300 Hz to 350 Hz.

DESCRIPTION OF THE PREFERRED EMBODIMENT

Figure 1:
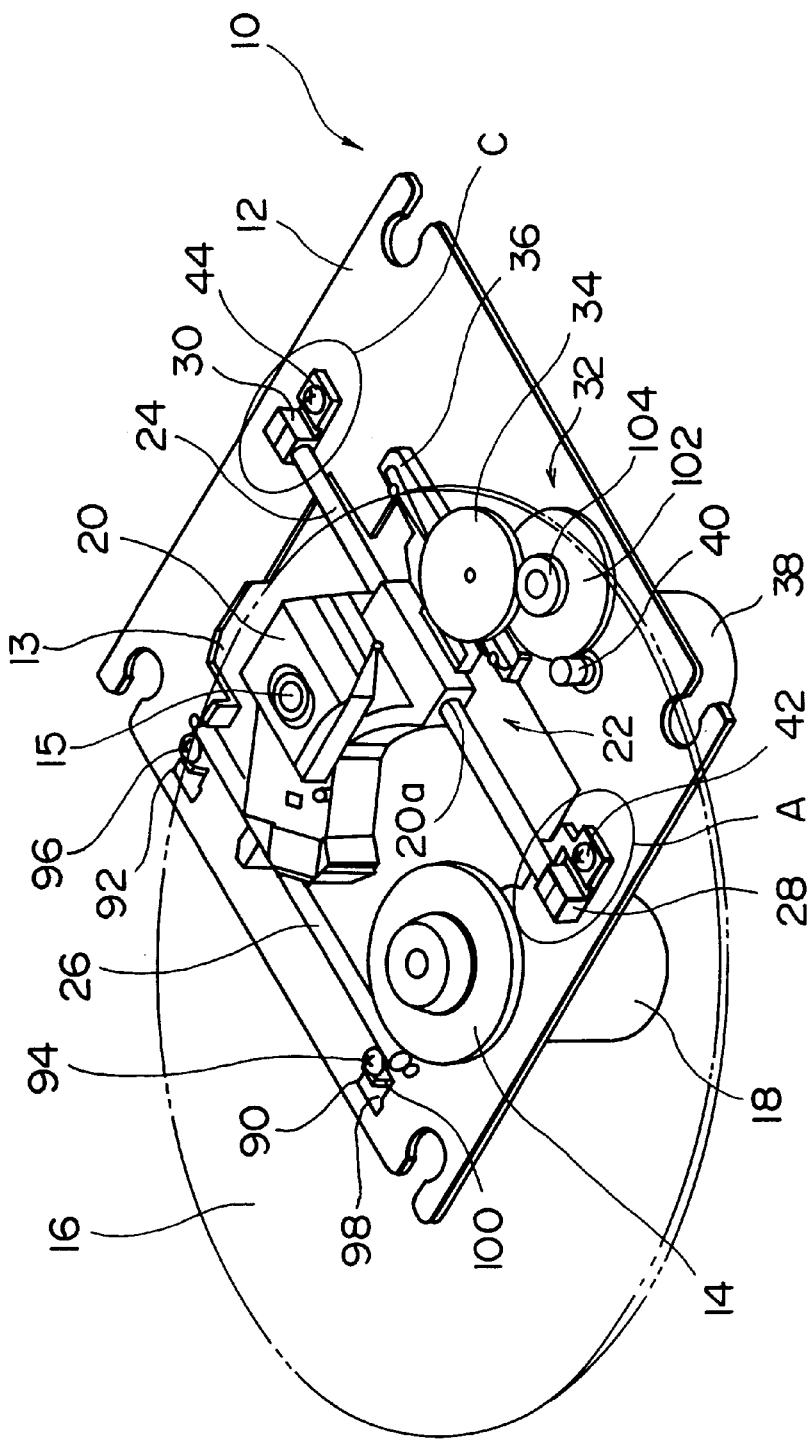
FIG. 1 is a schematic perspective view of an optical disk apparatus which is an embodiment of the present invention.

As shown in FIG. 1, an optical disk apparatus 10 which is an embodiment of the present invention comprises a chassis 12 and as supported on the chassis 12, an optical pickup 20, a turntable 14 for supporting an optical disk 16, and the like. It also comprises an optical disk drive motor 18 concentrically fixed to a rotation shaft of the turntable 14 for rotating it. The chassis 12 is provided with an optical pickup supporting/sliding mechanism 22 for supporting the optical pickup 20 and sliding it in the radial direction of the optical disk 16.

The optical pickup 20 includes a light emitting element such as a laser beam source (not shown) for directing a beam of light onto the surface of the optical disk 16, an optical member having a lens 15, and a light receiving element (not shown) for receiving reflected light from the optical disk 16. The lens 15 of the optical pickup 20 is supported by an elastically deformable support member, for example, a spring, so as to be displaceable. The lens 15 is provided with a winding wire (not shown) forming a coil which is connected to a lens actuator (not shown) fixed to the optical pickup 20. A permanent magnet is located on the lens actuator so as to face the lens 15. When an electric current is passed through the winding wire to generate a magnetic field, the lens 15 and the permanent magnet repel one another to move the former.

As shown in FIG. 1, the middle of the chassis 12 is provided with a hole 13 extending over the sliding range of the optical pickup 20. The hole 13 is provided for preventing a lead wire (not shown) which extends out of the optical pickup 20 from coming into contact with the chassis 12.

The ends of the optical pickup 20 are provided with guide holes matched with respective guide rods 24, 26. In FIG. 1, only the guide hole 20a for the guide rod 24 is shown. The surfaces of the guide holes are in slidable contact with the outer surfaces of the respective guide rods, whereby the optical pickup 20 can be slid in the radial direction of the optical disk 16 by the optical pickup supporting/sliding mechanism 22.

The optical pickup supporting/sliding mechanism 22 comprises the two guide rods 24, 26, which are stiff cylindrical members positioned parallel to the direction of the movement of the optical pickup 20, two bar holders 28, 30 for supporting the first guide rod 24 at the ends thereof, a gear mechanism 32 having a first gear 34, a rack 36 for converting rotational force from the first gear 34 into sliding force parallel to the direction of the movement of the optical pickup 20 and the like, a pickup drive motor 38 mounted on the chassis 12, and a gear 40 concentrically mounted on a rotation shaft of the pickup drive motor 38 and mated with another gear (described later).

Figure 2:
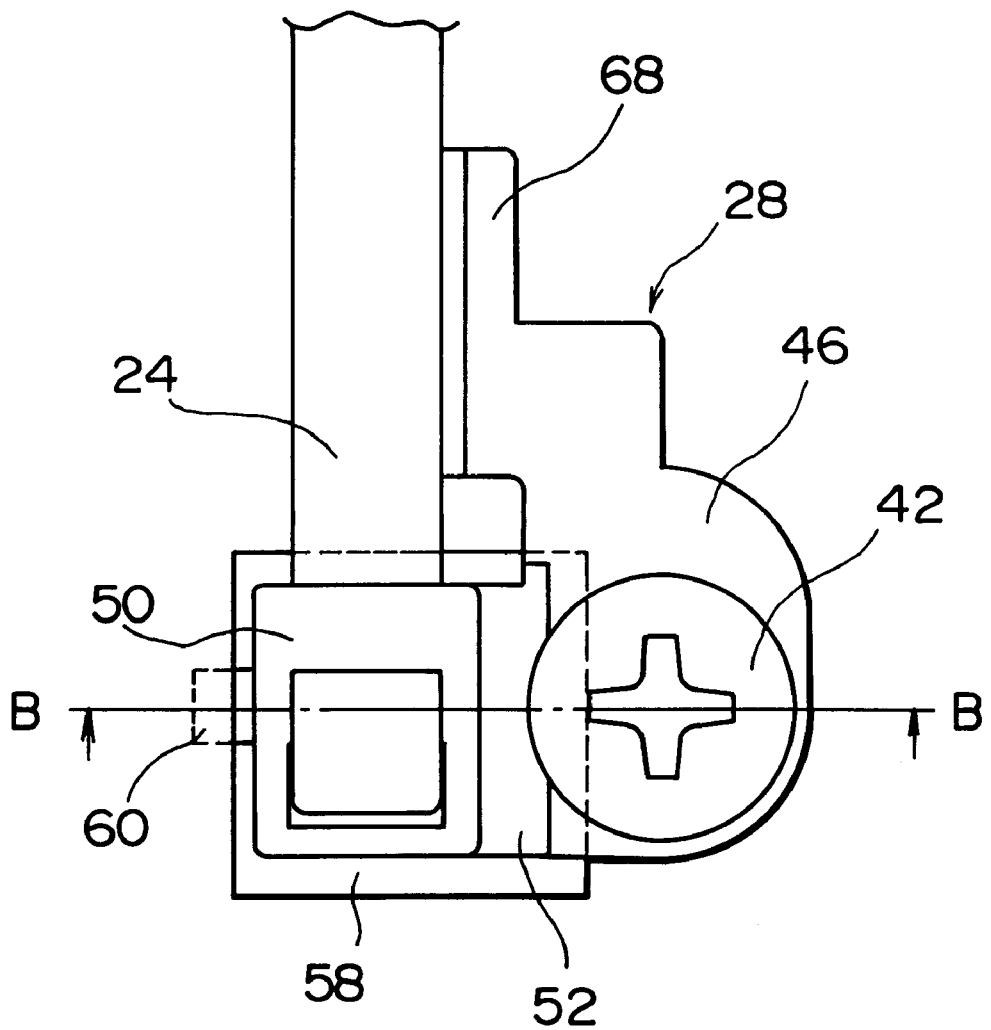
FIG. 2 is a schematic enlarged plan view of the portion marked A in FIG. 1.
Figure 3:
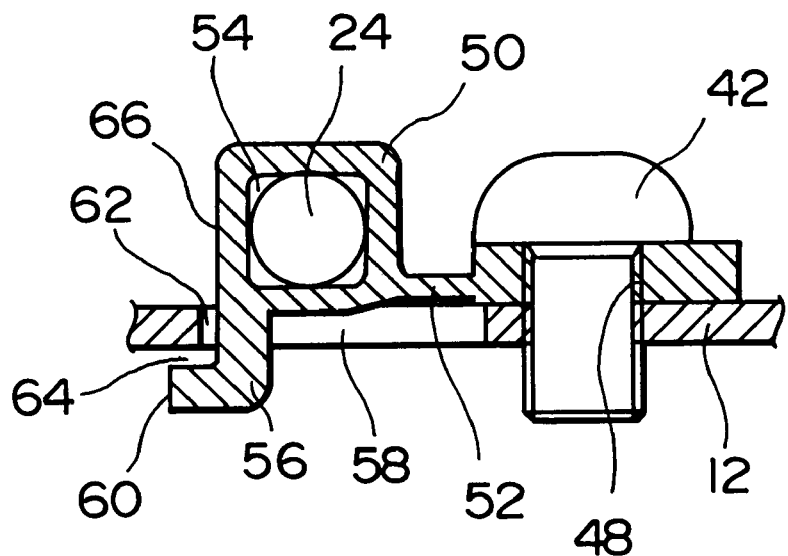
FIG. 3 is a schematic sectional view taken along line B—B in FIG. 2.

In this embodiment, the bar holders 28, 30 are formed of polyacetal resin and are mounted on the chassis 12 by screws 42, 44, respectively. More specifically, as shown in FIGS. 2 and 3, the bar holder 28 includes a base 46 having a screw hole 48 into which the screw 42 is inserted, a rod mounting section 50 for mounting the guide rod 24, and a thin section 52 located between the base 46 and the rod mounting section 50. The thin section is flexible in the vertical direction with respect to the surface of the optical disk 16.

The rod mounting section 50 includes an inserting hole 54 which receives the guide rod 24 and holds it at the inner surface thereof. In this embodiment, the cross section of the inserting hole 54 is substantially square, whereby a predetermined small area on each side of the square contacts with the guide rod 24 to hold it. The thus-constructed rod mounting section 50 accurately defines the position of the guide rod 24 since the four small areas of the inner sides thereof hold the guide rod 24. The rod mounting section 50 and the base 46 are stiff.

Further, the end of the rod mounting section 50 which is not adjacent to the thin section 52 is provided with a protruding section 56 which passes through a hole 58 provided in the chassis 12 and protrudes downwardly, and an extended section 60 which extends from the protruding section 56 so as to lie substantially parallel to the lower surface of the chassis 12. As shown in FIG. 2, the size of the hole 58 of the chassis 12 is larger than the cross section of the rod mounting section 50. Accordingly, a gap 62 remains between the side wall 66 of the rod mounting section 50 and the chassis 12. On the other hand, as shown in FIG. 3, a gap 64 is formed between the upper surface of the extended section 60 and the lower surface of the chassis 12. The hole 58 provided in the chassis 12, the flexible thin section 52 and the gaps 62, 64 allow the rod mounting section 50 to be displaced in the vertical direction with respect to the optical disk 16.

In addition, the rod mounting section 50 can be downwardly displaced until the guide rod 24 comes into contact with the upper surface of the chassis 12, and it can be upwardly displaced until the gap 64 between the upper surface of the extended section 60 and the lower surface of the chassis 12 is closed. In other words, the extended section 60 functions as a member for restricting upward displacement of the rod mounting section 50.

Further, the range over which the rod mounting section 50 can be displaced is determined such that the guide rod 24 does not come into contact with the upper surface of the chassis 12, and the upper surface of the extended section 60 does not come into contact with the lower surface of the chassis owing to the vibrations of the optical pickup 20 when the apparatus operates normally.

A movement restricting section 68 is formed along the guide rod 24 from the base 46 of the bar holder 28. The movement restricting section 68 is provided to limit the movement of the optical pickup 20 in the radial direction toward the center of the optical disk 16. The thickness of the movement restricting section 68 is less than that of the base 46, whereby the movement restricting section 68 is elastically deformable. By way of example, when the apparatus is actuated and the optical pickup 20 is slid in the radial direction toward the center of the optical disk 16 in order to read signals recorded on the inner side of the optical disk 16, the optical pickup 20 is stopped without impact by contact with the movement restricting section 68.

Figure 4:
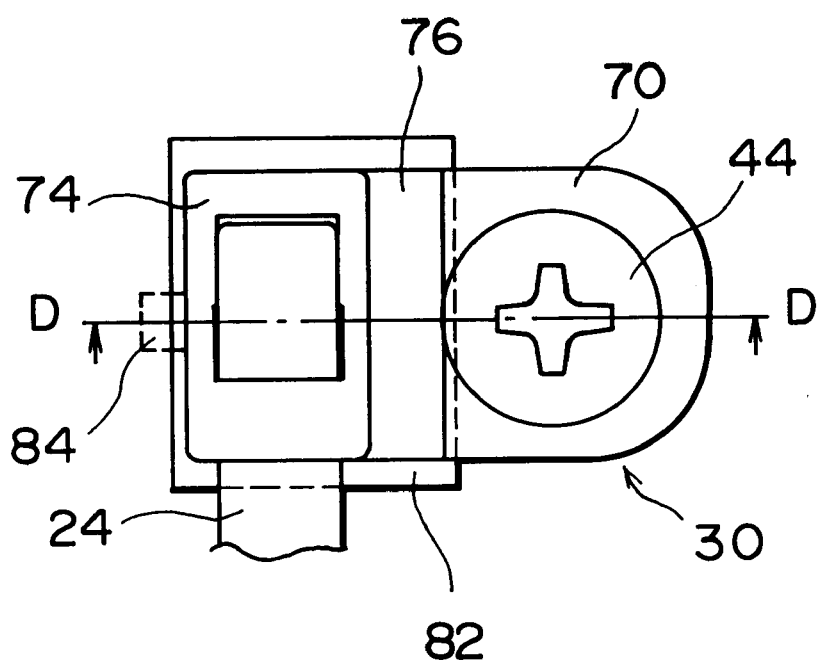
FIG. 4 is a schematic enlarged plan view of the portion marked D in FIG. 1.
Figure 5:
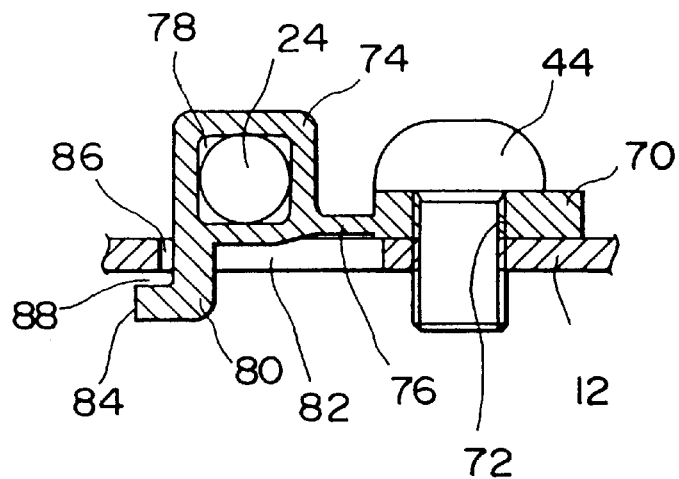
FIG. 5 is a schematic sectional view taken along line C—C in FIG. 4.

On the other hand, as specifically shown in FIGS. 4, and 5, the bar holder 30 includes a base 70 having a screw hole 72 into which the screw 44 is inserted, a rod mounting section 74 for fixing the guide rod 24, and a thin section 76 located between the base 70 and the rod mounting section 74. The thin section 76 is elastically deformable in the vertical direction with respect to the surface of the optical disk 16.

The rod mounting section 74 includes an inserting hole 78 which receives the guide rod 24 and holds it at the inner surface thereof. As in the rod mounting section 50 of the bar holder 28, the cross section of the inserting hole 78 is substantially square, whereby a predetermined small area on each side of the square engages with the guide rod 24 to hold it.

As in the bar holder 28, the end of the rod mounting section 74 which is not adjacent to the thin section 76 is provided with a protruding section 80 which passes through a hole 82 provided in the chassis 12 and protrudes downwardly, and an extended section 84 which extends from the protruding section 80 so as to lie substantially parallel to the lower surface of the chassis 12. Furthermore, as shown in FIGS. 4 and 5, a gap 86 remains between the rod mounting section 74 and the chassis 12, and a gap 88 remains between the extended section 80 and the lower surface of the chassis 12. The flexible thin section 76 and the like allow the rod mounting section 74 to be displaced in the vertical direction with respect to the optical disk 16. The sizes of the gaps 86, 88 are the same as those of the gaps 62, 64, respectively.

The optical pickup supporting/sliding mechanism 22 also includes two stiff fixing members 90, 92 for supporting the second guide rod 26 at the ends thereof. The fixing members 90, 92 are fixed to the chassis 12 by respective screws 94, 96. The fixing member 90 includes a base 98 having a screw hole (not shown) into which the screw 94 is inserted and a rod mounting section 100 for fixing the guide rod 26. The fixing member 92 is similarly constituted to the fixing member 90.

The gear mechanism 32 further includes a gear 102 mating with the above mentioned gear 40, and a gear 104 concentrically fixed to the rotation shaft of the gear 102. The gear 104 mates with the above mentioned first gear 34. The rotation of the pickup drive motor 38 of the gear mechanism 32 is transferred to the rack 36 via the gears 40, 102, 104 and 34, whereby the pickup 20 slides in the radial direction of the optical disk 16 as guided by the two guide rods 24, 26.

The operation of the thus constructed optical disk device, especially the optical pickup supporting/sliding mechanism 22 will now be explained.

When the operator places the optical disk on the turntable 14 and turns on the optical disk apparatus, the optical disk motor 18 is activated by a control signal from a control circuit (not shown), whereby the turntable 14 and the optical disk 16 located thereon are rotated. Simultaneously, the pickup drive motor 38 is started by another control signal from the control circuit, whereby the optical pickup 20 is slid along the guide rods 24, 26 in the radial direction toward the center of the optical disk 16 in order to read information recorded as pits thereon. Depending upon the control conditions, the optical pickup 20 may come into contact with the movement restricting section 68 during this operation. Since the movement restricting section 68 is elastically deformable, the optical pickup 20 can be stopped without impact.

Then, if the operator operates an input device (not shown) to give information indicative of a target track, the information from the input device is supplied to the control circuit (not shown). Next, the optical disk drive motor 18 is rotated and the optical disk 16 is controlled to rotate at a rotation speed appropriate for the position of the target track. Simultaneously, the pickup drive motor 38 is operated in accordance with another signal from the control circuit, whereby the gear mechanism 32 is operated to move the optical pickup 20 to the position where the light beam from the light emitting element is directed onto the target track of the optical disk 16.

When the optical pickup 20 reaches the vicinity of the target track on the optical disk 16, the light beam from the light emitting element is directed onto the target track via the optical member such as lens 15, and the light reflected from the optical disk is received by the light receiving element via the optical member, the received light signal is sent to a signal processing circuit (not shown) having a photoelectric device, an amplifier and the like to obtain a predetermined electric signal. When the light beam from the light emitting element is directed onto the target track, the lens actuator (not shown) provided in the optical pickup 20 finely adjusts the lens 15 of the optical member so as to cause the light beam to be properly directed onto the target track.

The vibrations which occur in the optical pickup and the like when the optical disk apparatus is operated will now be explained.

Figure 6:
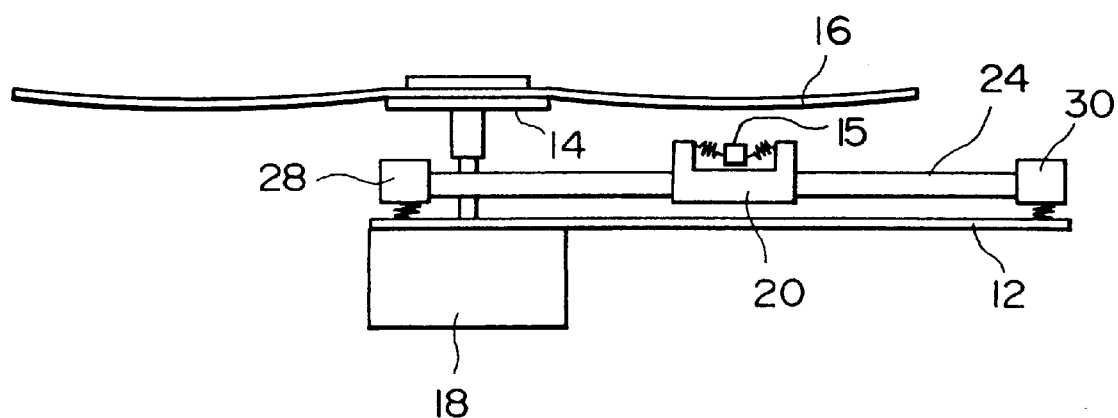
FIGS. 6 and 7 show operations of an optical disk apparatus which is an embodiment of the present invention.
Figure 7:
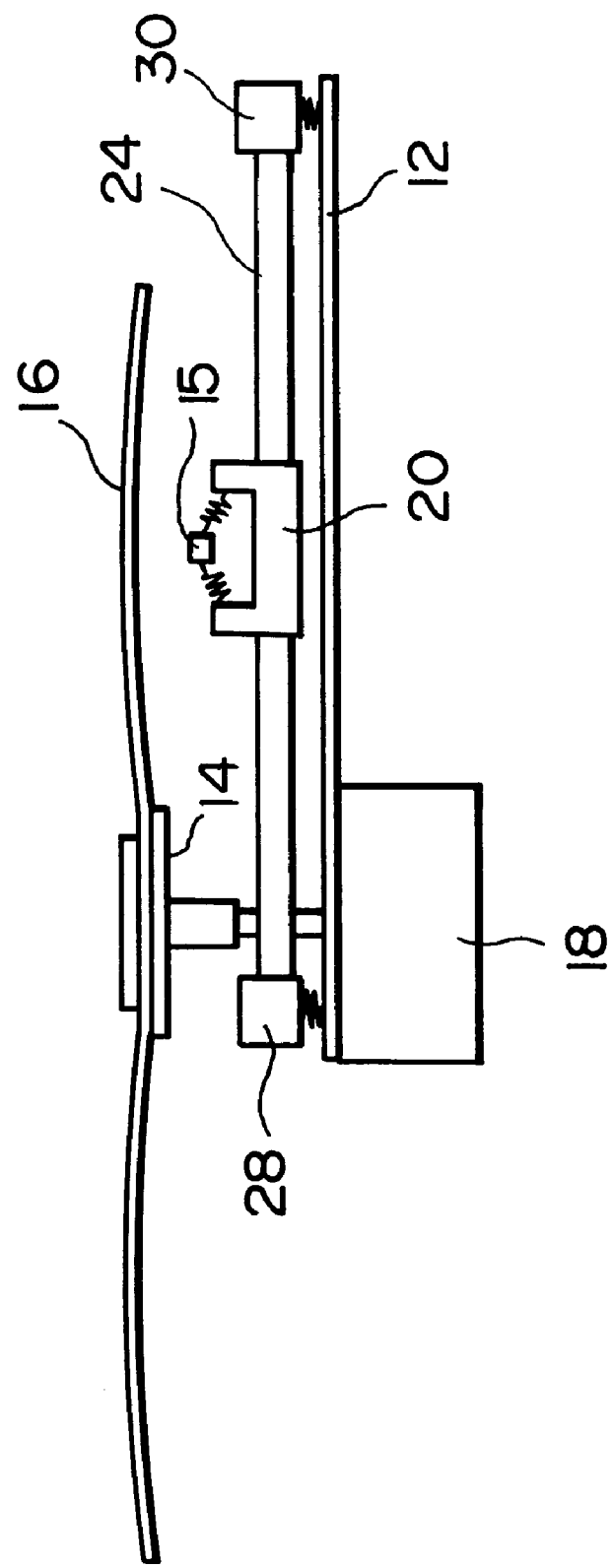

For example, when the lens actuator moves the lens by the repelling action of the magnetic field, owing to the mass of the lens, the force for driving the lens acts on the lens actuator as a force of reaction in the direction of the movement of the lens. In other words, as shown in FIG. 6, if the lens 15 is moved downward by the lens actuator, an upward force which moves the lens actuator and the optical pickup 20 fixing the lens actuator away from the chassis 12 is momentarily, generated. On the other hand, as shown in FIG. 7, if the lens is moved upward by the lens actuator, a downward force which brings the lens actuator and the optical pickup 20 closer to the chassis 12 is momentarily generated. These forces cause the optical pickup 20 to vibrate at its natural frequency. Generally, the frequency of the vibrations is 600 Hz or more.

Further, when the optical disk 16 is rotated, it vibrates at its natural frequency. Generally, the frequency of the vibrations is 450 Hz or more.

On the contrary, in this embodiment, as described later, the natural frequency of the system consisting of the guide rod 24 on which the optical pickup 20 is mounted, the bar holders 28, 30, and the chassis 12 is set to be less than that of the optical pickup 20.

The natural frequency will be now explained. The natural frequency $\omega n$ of the above mentioned system is defined by the equation $$\omega n = 1/(2\pi)\sqrt{(K/M)} \quad (1)$$

wherein K is the spring constant of the system and M is to the mass of the optical pickup 20.

Further, vibration transmissibility $\tau$, which indicates how the vibrations generated in the optical pickup are transferred to the chassis, is defined by the equation $$\tau = F/P = 1/\{(\omega/\omega n)^2 - 1\} \quad (2)$$

wherein F is the force transferred to the chassis, P is the force generated in the optical pickup, and $\omega$ is the natural frequency of the force generated in the optical pickup. If the transmissibility $\tau$ is less than 1, vibration damping properties are obtained.

Accordingly, as can be understood from the equation (2), it is preferable that the a relationship defined by equation (3) is established between the natural frequency ω of the optical pickup and the natural frequency ωn of the above mentioned system.

$$\omega/\omega n < \sqrt{2} \qquad (3)$$

As described above, in this embodiment, since the natural frequency of the optical pickup 20 is equal to or greater than 600 Hz, the transmissibility τ can be made less than 1 if the natural frequency of the system is set to be less than 424 Hz.

More preferably, the natural frequency of the system is selected in the range of 300 Hz to 350 Hz, because this causes the value of the transmissibility to fall in the range of 0.33 to 0.5, thus making it possible to efficiently prevent the vibrations from transferring.

Next, it will be explained how the natural frequency of the system is set. As the spring constant K in the equation (1) decreases, the spring tends to be easily moved. In other words, the thickness of the thin sections is substantially proportional to the spring constant K. Accordingly, by determining the thickness of the thin sections 52, 76 so as to determine the spring constant K, it is possible to set the desired natural frequency ωn of the system.

The determination of the natural frequency of the system causes the vibrations in the optical disk apparatus to be transferred or to be intercepted, as described below.

When the optical disk 16 is rotated, the vibrations of the optical pickup 20 are transferred to the guide rod 24 and the bar holders 28, 30. However, since the natural frequency of the above mentioned system consisting of the guide rod 24, the bar holders 28, 30 and the like is set to a predetermined value which is less than the natural frequency of the optical pickup 20, the vibrations of the optical pickup 20, more specifically, the vibrations whose frequency is greater than √2 times the natural frequency of the above mentioned system, are substantially intercepted by the bar holders 28, 30. As a result they are not transferred to the chassis 12. On the other hand, since the vibrations of the pickup 20 are not transferred to the turntable 14 and the optical disk 16, it is possible to prevent resonance of the optical disk 16 from occurring due to the vibrations of the optical pickup 20.

In addition, the optical pickup 20 is slid and the lens 15 is moved by the lens actuator provided in the optical pickup 20, which causes the thin sections 52, 76 to be elastically deformed to displace the rod mounting sections 50, 74 in the vertical direction. However, since the rod mounting sections 50, 74 are displaced in only the vertical direction, the positional relationship between the optical disk 16 and the optical pickup 20 does not change.

On the other hand, the vibrations of the optical disk 16 at its natural frequency when it is rotated vibrates the chassis 12. However, since the natural frequency of the above mentioned system consisting of the guide rod 24, the bar holders 28, 30 and the like is set to the predetermined value which is less than the natural frequency of the optical disk 16, the vibrations in the optical disk 16 are substantially intercepted by the bar holders 28, 30, which prevents them from being transferred to the optical pickup 20. Thus, it is possible to prevent the resonance of the optical pickup 20 from occurring due to the vibrations of the optical disk 16.

Thus, viewed as a vibration system, this embodiment enables interception of vibrations between the optical disk 16 and the optical pickup 20. Since vibrations of one are therefore not transferred to the other, it is possible to prevent both from resonating.

Next, assume that the apparatus is impacted from the outside. In this case, the vibrations generated in the chassis 12 by the impact are intercepted by the bar holders 28, 30. Accordingly, the vibrations are prevented from being transferred to the optical pickup 20. According to this embodiment, even if the optical disk apparatus is impacted from outside, vibrations due to this impact are prevented from being transferred to the optical pickup 20.

Furthermore, according to this embodiment, the guide rod 24 is supported by the bar holder 28 constituted by the base 46, the thin section 52 and the rod mounting section 50, and by the bar holder 30 constituted by the base 70, the thin section 76 and the rod mounting section 74, while the guide rod 26 is supported by the fixing members 90, 92. Accordingly, it is possible to hold the guide rods 24, 26 adjacent to the chassis 12. As a result, since the structure for supporting the optical pickup can be made thin, the optical disk apparatus can be made thin.

The present invention has thus been shown and described with reference to a specific embodiment. However, it should be noted that the present invention is in no way limited to the details of the described arrangements but changes and modifications may be made without departing from the scope of the appended claims.

For example, although in the above described embodiment, the cross sections of the inserting holes of the rod mounting sections 50, 74 of the bar holders 28, 30 which hold the guide rod 24 are square, the invention is not limited this shape and it is instead possible to make the cross section thereof circular, polygonal shape or the like.

Further, although in the above described embodiment, the natural frequency of the system consisting of the guide rod 24 on which the optical pickup 20 is mounted, the chassis 12, and the bar holders 28, 30 is set to a value selected in the range of 300 Hz to 350 Hz, it is not limited this arrangement. Specifically, insofar as the natural frequency of the system is less than that of the optical pickup and that of the optical disk, it is possible to prevent resonance from occurring.

Furthermore, although in the above described embodiment, the natural frequency of the vibrations generated in the optical pickup is equal to or greater than 600 Hz, this value varies depending upon the structure of the pickup. This is not a problem, however, since the natural frequency of the above mentioned system can be varied as required for the particular structure of the optical pickup.

Moreover, although in the above described embodiment, the bar holders 28, 30 are formed of polyacetal resin, the invention is not limited this arrangement, and it is instead possible to select another material, e.g. a plastic material, such that the thin section allow the rod mounting section to be displaced in the vertical direction.

Further, although in the above described embodiment, each of the bar holders 28, 30 is integrally formed, the invention is not limited this arrangement, and it is obvious that a member having flexibility, such as a leaf spring, can be located between the base and the rod mounting section to allow the rod mounting section to be displaced in the vertical direction.

Furthermore, in the present invention, the function of a single member may be accomplished by two or more physical members and the function of two or more members may be accomplished by a single physical member.

We claim:

1. An optical pickup apparatus comprising an optical pickup for directing a light beam onto pits formed in an optical disk and for receiving reflected light from the optical disk, an optical pickup supporting member including guide members for guiding the optical pickup in a radial direction of the optical disk, first mounting members for mounting ends of one of said guide members, and second mounting members for mounting ends of another of said guide members, and a chassis for mounting the first and second mounting members thereto, each of said first mounting members including a base fixed to said chassis, a guide member supporting member for fixedly supporting said one of said guide members, and a flexible member located between said base and said guide member supporting member for causing said guide member supporting member to be elastically displaced substantially only in a vertical direction with respect to a surface of the optical disk, wherein a natural frequency of a system consisting of said one of said guide members, said first mounting members, and said chassis is set to be less than that of said optical pickup and of the optical disk.

2. An optical pickup apparatus in accordance with claim 1, wherein said natural frequency of said system is less than $1/\sqrt{2}$ times that of said optical pickup.

3. An optical pickup apparatus in accordance with claim 2, wherein said first mounting members are integrally formed, and said flexible members are formed as thin sections located between said bases and said guide member supporting members.

4. An optical pickup apparatus in accordance with claim 2, wherein said chassis includes holes each for receiving a respective said guide member supporting member, each said guide member supporting member passing therethrough so as to be displaced downwardly.

5. An optical pickup apparatus in accordance with claim 4, wherein each of said guide member supporting members includes a protruding section passing through a respective said hole and extending downwardly, and an extended section parallel to a lower surface of said chassis and extending from an end of said protruding section, and wherein when said guide member supporting member is displaced upwardly by a predetermined distance, said extended section comes into contact with said lower surface of said chassis to restrict further displacement of said guide member supporting member.

6. An optical pickup apparatus in accordance with claim 2, wherein said natural frequency of said system is selected in a range of 300 Hz to 350 Hz.

7. An optical pickup apparatus in accordance with claim 1, wherein said first mounting members are integrally formed, and said flexible members are formed as thin sections located between said bases and said guide member supporting members.

8. An optical pickup apparatus in accordance with claim 7, wherein said chassis includes holes each for receiving a respective said guide member supporting member, each said guide member supporting member passing therethrough so as to be displaced downwardly.

9. An optical pickup apparatus in accordance with claim 7, wherein one of said first mounting members located at an inner side of the optical disk includes a movement restricting section extending outwardly from said base for restricting further movement of the optical pickup in the radial direction toward a center of the optical disk.

10. An optical pickup apparatus in accordance with claim 1, wherein said chassis includes holes each for receiving a respective said guide member supporting member, each said guide member supporting member passing therethrough so as to be displaced downwardly.

11. An optical pickup apparatus in accordance with claim 10, wherein each of said guide member supporting members includes a protruding section passing through a respective said hole and extending downwardly and an extended section parallel to a lower surface of said chassis and extending from an end of said protruding section, and wherein when said guide member supporting member is displaced upwardly by a predetermined distance, said extended section comes into contact with said lower surface of said chassis to restrict further displacement of said guide member supporting member.

12. An optical pickup apparatus in accordance with claim 1, wherein one of said first mounting members located at an inner side of the optical disk includes a movement restricting section extending outwardly from said base for restricting further movement of the optical pickup in the radial direction toward a center of the optical disk.

13. An optical pickup apparatus in accordance with claim 1, wherein each of said guide member supporting members includes an aperture for receiving said guide member.

14. An optical pickup apparatus in accordance with claim 13, wherein a cross section of said aperture is substantially square, said guide member being supported by predetermined areas of an inner surface of said guide member supporting member.

15. An optical disk apparatus comprising an optical pickup for directing a light beam onto pits formed in an optical disk and for receiving reflected light from the optical disk, an optical pickup supporting member including guide members for guiding the optical pickup in a radial direction of the optical disk, first mounting members for mounting ends of one of said guide members and second mounting members for mounting ends of another of said guide members, a chassis for mounting the first and second mounting members thereto, an optical pickup driving mechanism including gears and a motor to move the optical pickup in a radial direction of the optical disk, a turntable on which the optical disk is located, and an optical disk drive motor for rotating the turntable, each of said first mounting members including a base fixed to said chassis, a guide member supporting member for fixedly supporting said one of said guide members, and a flexible member located between said base and said guide member supporting member for causing said guide members supporting member to be elastically displaced substantially only in a vertical direction with respect to a surface of the optical disk, wherein a natural frequency of a system consisting of said one of said guide members, said first mounting member, and said chassis is set to be less than that of said optical pickup and of the optical disk.

16. An optical disk apparatus in accordance with claim 15, wherein said natural frequency of said system is less than $1/\sqrt{2}$ times that of said optical pickup.

17. An optical pickup apparatus comprising an optical pickup for directing a light beam onto an optical disk and for receiving reflected light from the optical disk, and processing the received light as an electronic signal, said apparatus comprising:

guide members engaged with said optical pickup and adapted for guiding the optical pickup in a radial direction of the optical disk; and a plurality of supporting members for supporting said guide members, a respective supporting member for supporting one of said guide members including a first portion for mounting said one of said guide members, a second portion fixed to a base member and a third portion for connecting said first portion to said second portion said third portion being elastically deformable to enable said one of said guide members to be displaceable in a vertical direction with respect to a surface of the optical disk;

wherein a natural frequency of a system including said optical pickup, said guide members and said base member is different from that of said optical pickup and/or said optical disk.

18. An optical pickup apparatus comprising an optical pickup for directing a light beam onto pits formed in an optical disk and for receiving reflected light from the optical disk, an optical pickup supporting member including guide members for guiding the optical pickup in a radial direction of the optical disk, first mounting members for mounting ends of one of said guide members, and second mounting members for mounting ends of another of said guide members, and a chassis for mounting the first and second mounting members thereto, each of said first mounting members including a base fixed to said chassis, a guide member supporting member for fixedly supporting said one of said guide members, and a flexible member located between said base and said guide member supporting member for causing said guide member supporting member to be elastically displaced substantially only in a vertical direction with respect to a surface of the optical disk, wherein a natural frequency of a system consisting of said one of said guide members, said first mounting members and said chassis is set to be different from that of said optical pickup and of the optical disk.

* * * * *

UNITED STATES PATENT AND TRADEMARK OFFICE
CERTIFICATE OF CORRECTION

PATENT NO : 5,933,407
DATED : August 3, 1999
INVENTOR(S) : Masayoshi WATANABE, et al.

It is certified that error appears in the above-identified patent and that said Letters Patent are hereby corrected as shown below:

Col. 1, line 19
  replace "Patent"
  with --Utility--.

Col. 1, line 23
  replace "Patent"
  with --Utility--.

Signed and Sealed this

Seventeenth Day of April, 2001

*Attest:*

NICHOLAS P. GODICI

*Attesting Officer*   Acting Director of the United States Patent and Trademark Office